US 8,429,609 B2

(12) United States Patent
Bhasker et al.

(10) Patent No.: US 8,429,609 B2
(45) Date of Patent: Apr. 23, 2013

(54) METHOD AND SYSTEM FOR WEB-BASED ENTERPRISE CHANGE AND CONFIGURATION MANAGEMENT REPORTS

(75) Inventors: Sapan Bhasker, Westford, MA (US); Susan Cohan, Needham, MA (US)

(73) Assignee: CA, Inc., Islandia, NY (US)

( * ) Notice: Subject to any disclaimer, the term of this patent is extended or adjusted under 35 U.S.C. 154(b) by 958 days.

(21) Appl. No.: 11/132,714

(22) Filed: May 19, 2005

(65) Prior Publication Data
US 2006/0004821 A1 Jan. 5, 2006

Related U.S. Application Data

(60) Provisional application No. 60/573,053, filed on May 21, 2004.

(51) Int. Cl.
*G06F 9/44* (2006.01)
(52) U.S. Cl.
USPC .......................................................... 717/122
(58) Field of Classification Search .................. 717/120, 717/121
See application file for complete search history.

(56) References Cited

U.S. PATENT DOCUMENTS

| | | | |
|---|---|---|---|
| 5,684,945 A | 11/1997 | Chen et al. | 395/182.18 |
| 5,812,849 A | 9/1998 | Nykiel et al. | 395/701 |
| 5,887,139 A | 3/1999 | Madison, Jr. et al. | 395/200.53 |
| 5,926,623 A | 7/1999 | Tsukakoshi et al. | 395/200.3 |
| 6,529,948 B1 | 3/2003 | Bowman-Amuah | 709/217 |
| 6,601,087 B1 | 7/2003 | Zhu et al. | 709/205 |
| 6,651,062 B2 | 11/2003 | Ghannam et al. | 707/10 |
| 6,662,357 B1 | 12/2003 | Bowman-Amuah | 717/120 |
| 6,704,933 B1 | 3/2004 | Tanaka et al. | 725/132 |
| 6,766,334 B1* | 7/2004 | Kaler et al. | 707/203 |
| 6,901,403 B1* | 5/2005 | Bata et al. | 707/101 |
| 6,973,466 B2 | 12/2005 | Kaler et al. | 707/203 |
| 7,031,787 B2* | 4/2006 | Kalthoff et al. | 700/105 |
| 7,073,050 B2* | 7/2006 | Chen et al. | 713/1 |

(Continued)

FOREIGN PATENT DOCUMENTS

| | | |
|---|---|---|
| WO | WO 01/90949 A1 | 11/2001 |
| WO | WO 03/017055 A2 | 2/2003 |
| WO | WO 2005/008396 | 1/2005 |

OTHER PUBLICATIONS

PCT Notification of Transmittal of the International Search Report with attached PCT International Search Report and Written Opinion of the International Searching Authority in International Application No. PCT/US05/17786 filed May 19, 2006 (8 pages), Mailed Mar. 16, 2007.

(Continued)

*Primary Examiner* — Philip Wang
(74) *Attorney, Agent, or Firm* — Baker Botts, L.L.P.

(57) ABSTRACT

A method and system for presenting an enterprise change and configuration report are provided. In accordance with one embodiment of the present application, a method for presenting an enterprise change and configuration report includes identifying at least one datasource that stored change management information, collecting change management information from the datasource and integrating the change management information into a change management report that is accessible via a web browser. A plurality of datasources that include change management data may be identified and change management data from each datasource of the plurality of datasources may be collected and integrated to provide the change management report.

21 Claims, 4 Drawing Sheets

U.S. PATENT DOCUMENTS

| | | | |
|---|---|---|---|
| 7,076,543 B1 | 7/2006 | Kirti et al. ................... | 709/223 |
| 2002/0002560 A1* | 1/2002 | Shah et al. .................. | 707/200 |
| 2002/0019864 A1 | 2/2002 | Mayer .......................... | 709/223 |
| 2002/0040469 A1 | 4/2002 | Pramberger .................. | 717/121 |
| 2002/0169745 A1* | 11/2002 | Hotti et al. ...................... | 707/1 |
| 2003/0135439 A1 | 7/2003 | Yagishita ..................... | 705/36 |
| 2003/0200226 A1 | 10/2003 | Wells et al. | |
| 2003/0233571 A1 | 12/2003 | Kraus et al. ................. | 713/200 |
| 2004/0010429 A1* | 1/2004 | Vedula et al. .................. | 705/7 |
| 2004/0135805 A1 | 7/2004 | Gottsacker et al. ........... | 345/751 |
| 2004/0139183 A1 | 7/2004 | Motoyama et al. .......... | 709/223 |
| 2004/0177244 A1 | 9/2004 | Murphy et al. .............. | 713/100 |
| 2004/0224674 A1 | 11/2004 | O'Farrell et al. ............ | 455/418 |
| 2004/0243647 A1* | 12/2004 | Oheda .......................... | 707/200 |
| 2005/0102405 A1 | 5/2005 | Siegel .......................... | 709/227 |
| 2005/0138014 A1* | 6/2005 | Bhasker et al. ................. | 707/3 |
| 2005/0138150 A1* | 6/2005 | Bhasker et al. .............. | 709/220 |
| 2005/0138151 A1* | 6/2005 | Lam et al. .................... | 709/220 |
| 2005/0138160 A1* | 6/2005 | Klein et al. .................. | 709/223 |
| 2006/0010425 A1 | 1/2006 | Willadsen et al. ............ | 717/120 |

OTHER PUBLICATIONS

Communication Pursuant to Article 96(1) and Rule 51(1) EPC from European Patent Office regarding Application No. 04777740.4-2201; Ref. HCD/J00048452EP, Mar. 5, 2007.

M2 Presswire; Apr. 23, 2002; "Computer Associates: CA's AllFusion suites herald new era for eBusiness application life cycle management; Integrated modeling, process and change management solutions control life cycle costs and automate development tasks across platforms".

PR Newswire; Dec. 18, 2001; "CA Enhances Diagnosis Solutions to Speed Troubleshooting of z/OS and OS/390 Applications".

PR Newswire; Nov. 28, 2001; "CA Launches New CleverPath Brand of Portal-Based Business Intelligence Solutions; Customers Gain Unmatched Capabilities for Quickly Gathering, Analyzing, and Presenting Information from Heterogeneous Sources".

USPTO Office Action Summary for U.S. Appl. No. 10/888,265, filed Jul. 9, 2004; Inventor: Bhasker, Nov. 2, 2006.

USPTO Office Action Summary for U.S. Appl. No. 10/888,265, filed Jul. 9, 2004; Inventor: Bhasker, Apr. 20, 2007.

USPTO Office Action Summary for U.S. Appl. No. 10/888,265, filed Jul. 9, 2004; Inventor: Bhasker, Jan. 7, 2008.

USPTO Office Action Summary for U.S. Appl. No. 10/888,265, filed Jul. 9, 2004; Inventor: Bhasker, Aug. 22, 2008.

European Patent Office, "Communication," Supplementary European Search Report, Application No./Patent No. 05751846.6-1225/1769388 PCT/US2005017786, Dec. 9, 2011, 4 pages.

Anonymous, :AllFusion (TM) Change Manager Enterprise Workbench, Enterprise Change and Configuration Management Jan. 1, 2003, XP55013491, USA, retrieved from the Internet: URL:http://www.faj.co.jp/mainframe/workbench/pdf/pd.pdf, retrieved on Nov. 30, 2011.

Don Leclair, "Breaking Down Barriers With Microsoft.NET," Apr. 21, 2003, pp. 1-16, XP55013488, USA, retrieved from the Internet: XP55013488, USA, URL:http://citeseerx.ist.psu.edu/viewdoc/summary?doi=10.1.1.197.7324, Retrieved on Nov. 30, 2011.

Munirul Islam et al., "CCMS: A Geographically Distributed Concurrent Change and configuration Management System," Bell Labs Technical Journal, Wiley, CA, vol. 8, No. 3, Jan. 1, 2003, pp. 111-113 XP001186114, ISSN: 1089-7089, 23 pages.

European Patent Office—Netherlands, "Communication pursuant to Article 94(3) EPC", Application No. 05751846.6-1225, Ref. HCD/J00049343EP, (6 pgs), Apr. 4, 2012.

European Patent Office—Munich; Communication Pursuant to Article 94(3) EPC for Application No. 04 777 740.4-2201; Ref: HCD/J00048452EP, dated Aug. 18, 2010 (8 pages).

Hall, Richard S., et al., "An Architecture for Post-Development Configuration Management in a Wide-Area Network", IEEE Comput. Soc., 0-8186-7813-5/97, pp. 269-278, dated May 1997 (10 pgs).

Jae-Won Choi, et al., "A Web-based Management System for Network Monitoring", IEEE Comput. Soc., 0-7803-7658-7/02, pp. 98-102, dated Jul. 2002 (5 pgs).

"AllFusion™ Change Manager Enterprise Workbench", Enterprise Change and Configuration Management, Computer Associates, XP007917571, dated 2003 (4 pages).

"AllFusion™ Harvest Change Manager Version 5.1.1, Service Pack 1 and AllFusion™ Harvest Change Manager Web Interface(HarWeb) Version 3.1 Service Pack 1", Computer Associates, XP007917572, dated May 20, 2003 (1 page).

European Patent Office—Munich; Communication Pursuant to Article 94(3) EPC for Application No. 04 777 740.4-2201; dated Mar. 24, 2011 (10 pages).

CA Transforming IT Management, "CleverPath Forest & Trees r7.1; CleverPath Dashboard Option r7.1," dated Mar. 8, 2005 (2 pages).

CA Transforming IT Management, "CA Software Change Manager," dated 2008 (2 pages).

Business Publications, IBM Expanding in Mainframe Unix, but market prospects still unclear; Electronic News, Jun. 29, 1992 by Jonathan Cassell, Topic: RSS Feed (3 pgs).

Manufacturing Industry, IBM Expanding in Mainframe Unix (AIX), but market prospects still unclear; Electronic News, Jun. 29, 1992, by Jonathan Cassell (2 pgs).

Communication; search report Pursuant to Article 153(7) EPC, Ref. No. HCD/J00048476EP, Appl. No. 1243/1649342 PCT/US2004021841 dated Sep. 23, 2009 (3 pgs).

USPTO, Non-Final Office Action, U.S. Appl. No. 10/888,273, filed Jul. 9, 2004, in re: Sapan Bhasker, (16 pgs).

USPTO, Non-Final Office Action, U.S. Appl. No. 10/888,273, filed Jul. 9, 2004, in re: Sapan Bhasker, (20 pgs).

USPTO, Final Office Action, U.S. Appl. No. 10/888,273, filed Jul. 9, 2004, in re: Sapan Bhasker, (23 pgs).

USPTO, Non-Final Office Action, U.S. Appl. No. 10/888,273, filed Jul. 9, 2004, in re: Sapan Bhasker, (21 pgs).

USPTO, Final Office Action, U.S. Appl. No. 10/888,273, filed Jul. 9, 2004, in re: Sapan Bhasker, (30 pgs).

USPTO, Non-Final Office Action, U.S. Appl. No. 10/888,273, filed Jul. 9, 2004, in re: Sapan Bhasker, (23 pgs).

USPTO, Final Office Action, U.S. Appl. No. 10/888,273, filed Jul. 9, 2004, in re: Sapan Bhasker, (27 pgs).

USPTO, Non-Final Office Action, U.S. Appl. No. 10/888,273, filed Jul. 9, 2004, in re: Sapan Bhasker, (28 pgs).

USPTO, Final Office Action, U.S. Appl. No. 10/888,273, filed Jul. 9, 2004, in re: Sapan Bhasker, (29 pgs).

USPTO, Examiner's Answer to Appeal Brief, U.S. Appl. No. 10/888,273, filed Jul. 9, 2004, in re: Sapan Bhasker, (7 pgs).

USPTO Notice of Allowance and Fee(s) Due, U.S. Appl. No. 10/888,275; Filing Date: Jul. 9, 2004; (5 pgs).

USPTO PTO non-final OA, U.S. Appl. No. 10/888,275; Filing Date: Jul. 9, 2004; (6 pgs).

USPTO Response to Non-Compliant Amd. And Response Pursuant to 37 C.F.R. §1.111, U.S. Appl. No. 10/888,275; Filing Date: Jul. 9, 2004; (11 pgs).

* cited by examiner

METHOD AND SYSTEM FOR WEB-BASED ENTERPRISE CHANGE AND CONFIGURATION MANAGEMENT REPORTS

REFERENCE TO RELATED APPLICATIONS

The present specification is based on co-pending U.S. Provisional Patent Application No. 60/573,053 filed May 21, 2004 entitled METHOD AND SYSTEM FOR WEB-BASED ENTERPRISE CHANGE AND CONFIGURATION MANAGEMENT REPORTS, the entire contents of which are herein incorporated by reference.

TECHNICAL FIELD

The system and method of the present application are generally related to information processing environments in which software changes and configurations are managed. More specifically, the system and method of the present application are related to providing an enterprise change and configuration report.

BACKGROUND

Large corporations deploy different change and configuration management (CCM) applications to manage their software on different distributed and mainframe platforms. Users of these CCM applications typically have a need to access these different applications on different platforms in order to generate and view CCM reports regarding the current status of change and configuration management information, or change management information. This requires expertise on different platforms like Mainframe, UNIX and Windows in addition to sufficient product knowledge of different applications in order to be able to generate the reports. Accordingly, there is a need to enable users to generate, view and print the enterprise wide changes and configuration management reports from central point using a web-based application.

For example, Computer Associates International (CA) currently sells change and configuration management applications like the AllFusion Endevor Change Manager for mainframe platforms and AllFusion Harvest Change Manager for UNIX and Windows platforms. Typically change and configuration management information is stored in different databases like Oracle, Ingres and SQL Server, etc. On mainframes, the CCM information is typically stored in VSAM (Virtual Storage Access Method) files. Additionally, the AllFusion Change Manager Enterprise Workbench is a web-based portal that offers Enterprise wide change management capability by enabling access to both AllFusion Endevor Change Manager and AllFusion Harvest Change Manager from a web-based application. Each of these products includes the reporting features that allow users to view and print CCM reports pertaining to the current status of the CCM information being managed by these applications. Currently in order to generate the change management reports on these different applications, the user needs to know how to access, and/or login to these different platforms and requires sufficient product knowledge about these applications to be able to generate the CCM reports. Accordingly, there is a need to provide a method and system for presenting an enterprise change and configuration report that avoids the problems described above.

SUMMARY

This application describes methods and systems for collecting change management information from different datasources associated with a plurality of different CCM applications on a plurality of different platforms. The application further discloses methods and systems for presenting this change management information in the form of an integrated change management report accessible via a web-browser.

A method for presenting enterprise change and configuration management reports according to an exemplary embodiment of the present application includes identifying at least one datasource that stores change management information, collecting the change management information from the datasource and integrating the collected change management information to provide a change management report that is accessible via a web browser.

A system for presenting enterprise change and configuration management reports according to an embodiment of the present application includes an identifying device adapted to identify at least one datasource that stores change management information, a collecting device adapted to collect change management information from the datasource identified by the identifying device and an integrating device adapted to integrate the collected change management information into a change management report that is accessible via a web browser.

A program storage device according to an embodiment of the present application is readable by a machine, and tangibly embodies a program of instructions executable by the machine to perform method steps for presenting an enterprise change and configuration management report. The method steps include identifying at least one datasource that stores change management information, collecting change management information from the datasource and integrating the collected change management information to provide a change management report that is accessible via a web browser.

A computer system according to an embodiment of the present application includes a processor and a program storage device readable by the computer system, tangibly embodying a program of instructions executable by the processor to perform method steps for presenting a change and configuration management report, wherein the method steps include identifying at least one datasource that stores change management information, collecting change management information from the datasource and integrating the collected change management information to provide a change management report that is accessible via a web browser.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
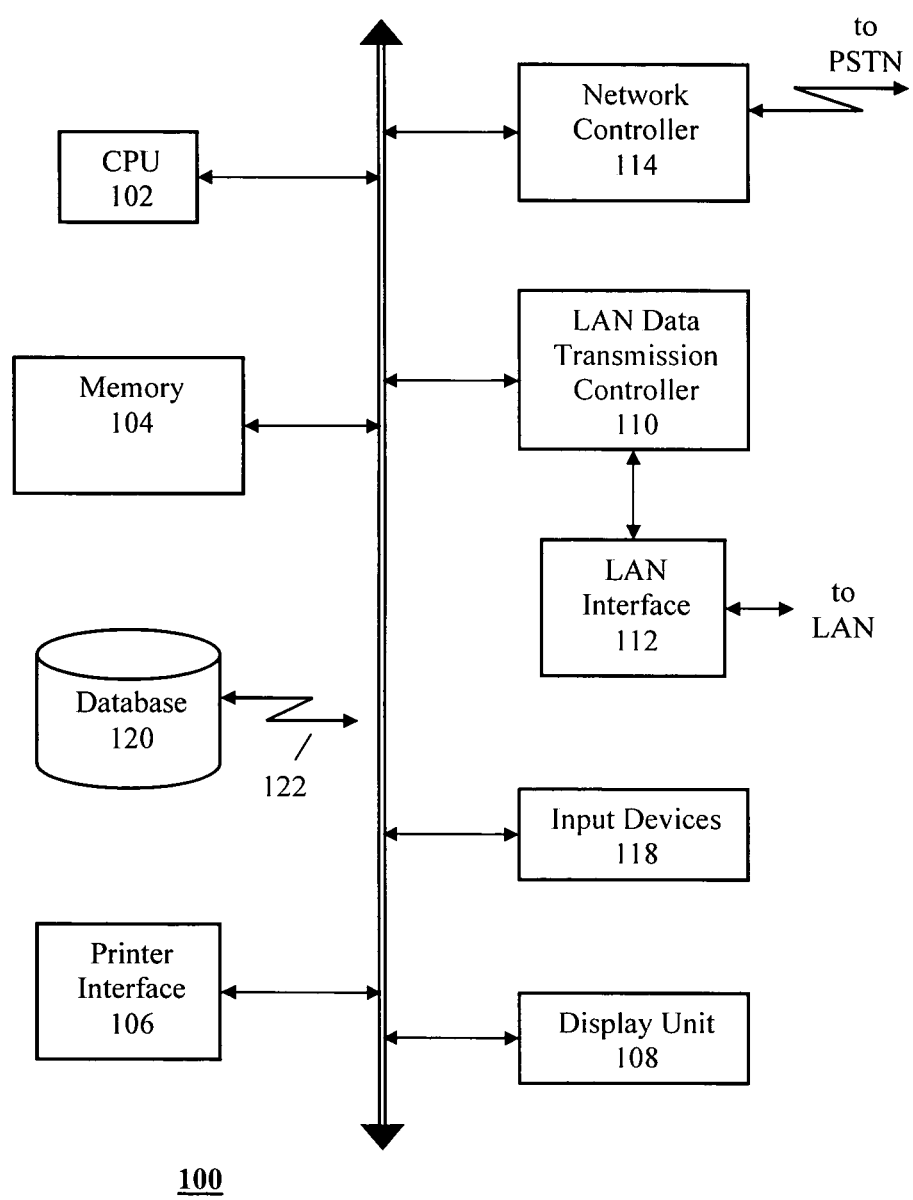
FIG. 1 shows an example of a computer system capable of implementing the method and system of the present disclosure.

In describing the preferred embodiments of the present application illustrated in the drawings, specific terminology is employed for sake of clarity. However, the present application is not intended to be limited to the specific terminology so selected and it is to be understood that each specific element includes all technical equivalents which operate in a similar manner.

The method and system of the present application may be implemented in the form of a software application running on a computer system such as a mainframe, personal computer (PC), handheld computer, server, etc. The computer system may be linked to a database or various types of storage media. The link may be, for example, via a direct link such as a direct hard wire or wireless connection, via a network connection such as a local area network, or via the Internet.

An example of a computer system capable of implementing the present method and apparatus is shown in FIG. 1. The computer system referred to generally as system 100 may include a central processing unit (CPU) 102, memory 104, a printer interface 106, a display unit 108, a LAN (local area network) data transmission controller 110, a LAN interface 112, a network controller 114, an internal bus 116, a database 120 and one or more input devices 118 such as, for example, a keyboard, mouse, etc. Naturally, other components may be included in the computer system 100 and some components may not be present.

Figure 2:
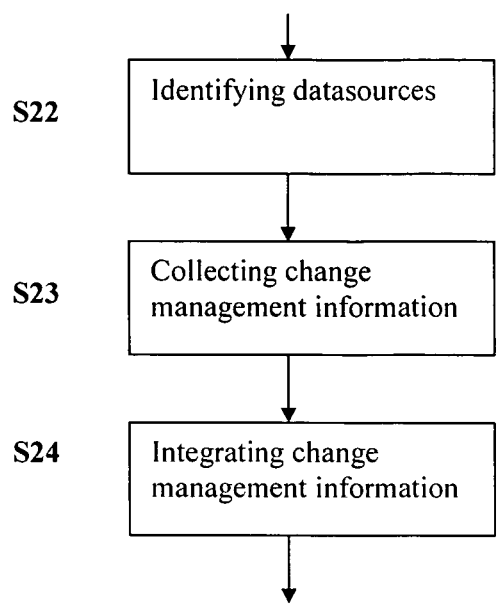
FIG. 2 shows a flow chart of a method for presenting an enterprise change and configuration report according to an embodiment of the present application.

A method for presenting an enterprise change and configuration management report is discussed below with reference to FIG. 2.

In step S22, at least one datasource that stores change management information is identified. Naturally, it is likely that more than one datasource in an enterprise stores change management information. In such a case, a plurality of datasources that store change management information can be identified in step S22. These datasources generally include a database or databases that are used by CCM management applications, for example, the databases typically utilized in CCM management applications implemented on UNIX and Windows platforms. Datasources may also include Virtual Storage Access Method (VSAM) files such as those typically utilized by CCM applications implemented on mainframe platforms. Since an enterprise will commonly include all of these platforms, the datasource or datasources that are identified in S22 will typically include at least databases and VSAM files. The present application, however, is not limited to databases and VSAM files and may include any datasource or other storage medium and/or device that stores change management information.

The change management information is collected from the datasource or datasources in step S23. That is, the change management information that is stored in the various datasources may be collected in step S23. The collection of change management information may be implemented in different ways for different datasources. For example, in a preferred embodiment of the present application, where the datasource is a database such as those typically utilized to store control management information for Windows and Unix platforms, the control management information may be collected using Structure Query Language (SQL) queries. SQL in an ANSI standard computer language used to access databases. On the other hand, where the datasource is a VSAM file or files such as those typically used to store change management information in a mainframe platform, the control management information is preferably downloaded using an Application Programming Interface (API) and preferably written to a file, at least temporarily, in Comma Separated Value (CSV) format.

In step S24, the collected CCM information is integrated into a change management report. That is, the change management information collected in S23 may be integrated into a single report that reflects control management information from every datasource in the enterprise. In a preferred embodiment, the change management report is provided in HTML format such that it is easily accessed and displayed using a web browser. Generally, the change management report may include change management information from every datasource that stores change management information in the enterprise, however, the report may be customized to present whatever change management information is desired. For example, the change management report may be customized to include only change management information related to certain datasources, or only change management information from certain platforms in the enterprise.

Figure 3:
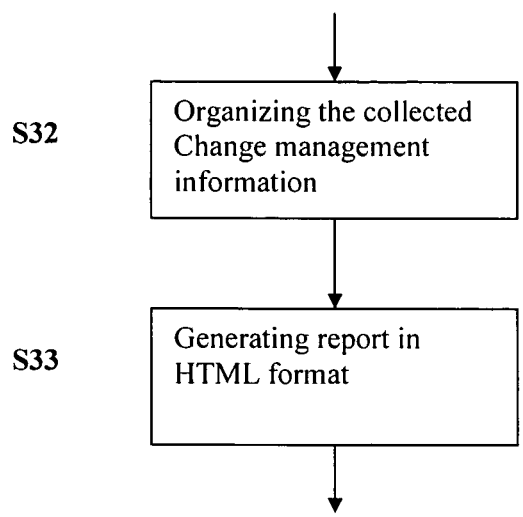
FIG. 3 shows a flow chart of a integrating step of the method of FIG. 2 according to an embodiment of the present application.

The integrating step S23 is discussed below with reference to FIG. 3. In step S32, the collected change management information is organized for inclusion in the change management report. The organization of the change management data may include for example, groups change management information based on the datasource it was collected from or based on the type of platform from which it was collected. In step S33, the change management report may be generated in HTML format based on the organized information. That is, the change management report is generated in HTML format and reflects the organizing of S32. The organizing in S32 may further include a step of selecting desired change management information to be organized. In this manner, only selected change management information is organized and reflected in the change management report generated in step S33.

As noted above, the change management report is preferably provided in HTML format such that it is easily accessible to and displayed via a web browser, for example. Thus, the methodology of the present application allows the collection of change management information from one or more datasources and the generation of a single change management report representative of change management information of various distributed platforms that is accessible from a single web portal.

Figure 4:
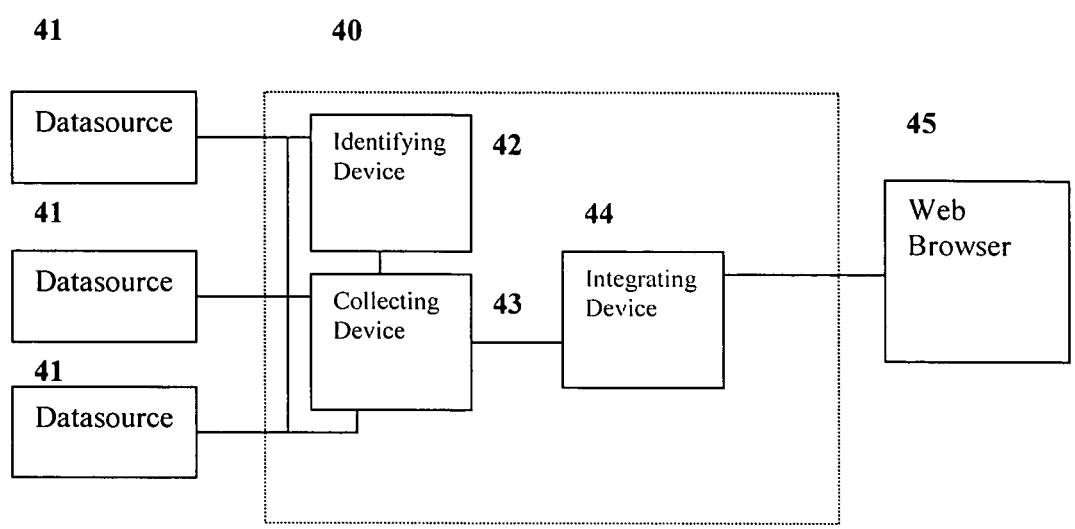
FIG. 4 shows a block diagram of a system for presenting an enterprise change and configuration report according to an embodiment of the present application.

A system 40 for presenting an enterprise change and configuration management report according to an embodiment of the present application is discussed below with reference to FIG. 4. An identifying device 42 is adapted to identify at least one datasource 41 that stores change management information. A collecting device 43 is adapted to collect change management information from the datasource identified by the identifying device 42. An integrating device 44 is adapted to integrate the collected change management information into a change management report that is accessible via a web browser 45. As illustrated in FIG. 4, the identifying device 42 may identify several datasources 41 and the collecting device 43 may collect change management information from the several datasources. The integrating device 44 integrates the collected change management information into a change management report that is then accessible via the web browser 45.

The system depicted in FIG. 4 can substantially perform the method discussed with reference to FIGS. 1-3 above, and therefore is not described in further detail herein.

For example a web-based application may be provided to generate, view and print change and configuration management reports for different CCM applications on different platforms from a central location. CA's CleverPath Reporter is a distributed enterprise reporting solution and can be used for this purpose. Pursuant to this exemplary embodiment, the enterprise CCM reporting capability can be integrated into the AllFusion Change Manager Enterprise Workbench, allowing users to generate change management reports for AllFusion Endevor Change Manager, AllFusion Harvest Change Manager and AllFusion Change Manager Enterprise Workbench from a single web based interface.

In one exemplary embodiment, the method described with reference to FIGS. 1-3 may be implemented via CA's All Fusion Change Manager Enterprise Workbench application. The Workbench application is a web-based application which allows access to CA's All Fusion Harvest Change Manager application. The Harvest Change Manager provides CCM information for Unix and Windows based platforms. The Workbench application also provides access to CA's All Fusion Endevor Change Manager application which provides CCM information for mainframe platforms.

The change management information for the Enterprise Workbench and the Harvest Change Manager is typically stored in databases like Oracle, Ingres and SQL Server, etc. on different distributed platforms like UNIX and Windows. These databases are thus among the datasources identified in step S22 of the present application. The change management information for the Harvest Change Manager application is typically stored in VSAM files on the mainframe. These VSAM files are also datasources that may be identified in S22.

In a preferred embodiment, the Workbench application uses CA's CleverPath Reporter to collect the CCM information as described in step S23. That is, for example, when a user wants to generate AllFusion Enterprise Workbench and AllFusion Harvest Change Management CCM reports, a CleverPath Reporter Server may directly read the change management information from the database or databases associated with the AllFusion Enterprise Workbench and the AllFusion Harvest Change Manager using SQL (Structured Query Language) queries, which are preferably defined within CleverPath report files. As noted above, change management reports are preferably provided in S25 in HTML format, thus the CleverPath Reporter may output change management information in HTML format. In order for the Reporter Server to access the database or databases, the database client components may be installed on a computer where the CleverPath Reporter Server is installed. The users can access these reports in HTML format from the All Fusion Change Manager Enterprise Workbench application, which is a web based application.

In the case of All Fusion Endevor Change Manager, the change management information may be stored in VSAM files on a mainframe. When the user wants to generate the CCM reports for the Endeavor Change Manager, the information needed for Endevor reports can be collected for example as described in step S23 by downloading the information from the mainframe using an API and writing it to a file in the CSV format. The CleverPath Reporter may read the CSV files using, for example, Microsoft Text OBDC driver, which is commonly available and can convert it to a report in HTML format. Pursuant to the above described exemplary embodiment, the user will be able to generate and view the CCM reports for Enterprise Workbench, Harvest and Endevor from the Enterprise Workbench web-based application. That is, change management information may be collected from the Enterprise Workbench, Harvest and Endevor applications and accessed via a web-based application.

Pursuant to another exemplary embodiment, the CleverPath Reporter application includes a Reporter Builder application, which may be used to build, or integrate the collected information into one or more report files that may be used to generate change management reports. The Reporter Server application may be used to run report files on a command line to generate the reports. The output of the Reporter Server command line program may be the reported in the HTML format.

Pursuant to this embodiment, once integrated into Enterprise Workbench discussed above, certain pre-defined Enterprise Workbench, Endevor and Harvest reports may be available through menu options on the Enterprise Workbench web application. That is, a user may select the change management information to be collected and integrated into a report based on predefined report selections. A selected report file can be run using the Reporter Server command line program and a generated report in HTML format can be made available to a user to view or print from a web page. The users can also use the Reporter Builder to build their own customized reports and integrate them into the Enterprise Workbench application.

The present disclosure may be conveniently implemented using one or more conventional general purpose digital computers and/or servers programmed according to the teachings of the present disclosure. Appropriate software coding can readily be prepared based on the teachings of the present disclosure. The present disclosure may also be implemented by the preparation of application specific integrated circuits or by interconnecting an appropriate network of conventional component circuits.

The above-described embodiments are illustrative, and numerous additional modifications and variations can be introduced to these embodiments without departing from the spirit of the disclosure or from the scope of the appended claims. For example, elements and/or features of different illustrative embodiments may be combined with each other and/or substituted for each other within the scope of the disclosure and appended claims.

Additional variations may be apparent to one skilled in the are from reading U.S. Provisional Patent Application No. 60/573,053, filed May 21, 2004, the entire contents of which are incorporated by reference herein.

What is claimed is:

1. A method for presenting an enterprise change and configuration management report comprises:
    identifying at least one first datasource that stores first change management information describing software changes and configurations made to one or more first software applications installed on a first software platform from a first change and configuration management application operable to manage software changes and configurations, wherein the at least one first datasource comprises at least one database that operates on the first software platform;
    collecting the first change management information from the at least one first datasource;
    identifying at least one second datasource that stores second change management information describing software changes and configurations made to one or more second software applications installed on a second software platform from a second change and configuration management application operable to manage software changes and configurations, wherein the at least one second datasource operates on the second software platform, wherein the at least one second datasource comprises at least one VSAM file;
    collecting the second change management information from the at least one second datasource; and
    integrating, by a computer, the collected first change management information with the collected second change management information to provide a change management report that is accessible via a web browser.

2. The method of claim 1, wherein the at least one database is used to store the first change management information in one of a Unix platform and a Windows platform.

3. The method of claim 2, wherein the first collecting step further comprises collecting the first change management information from the at least one database using SQL queries.

4. The method of claim 1, wherein the second collecting step further comprises collecting the second change management information from the VSAM file using an API to download the second change management information and writing the second change management information to a file in CSV format.

5. The method of claim 1, wherein the step of integrating further comprises:
   organizing the collected first and second change management information into a report format; and
   generating the change management report in HTML format.

6. The method of claim 5, wherein the organizing step further comprises:
   selecting desired change management information to be included in the organizing step, wherein the desired change management information includes change management information from at least one predetermined datasource.

7. The method of claim 1, wherein:
   the first change and configuration management application is specific to a first software platform; and
   the second change and configuration management application is specific to a second software platform.

8. The method of claim 7, wherein the first change and configuration management application is used to manage change management information from software specific to the first software platform and the second change and configuration management application is used to manage change management information from software specific to the second software platform.

9. The method of claim 8, wherein the first software platform is a distributed software platform and the second software platform is a mainframe platform.

10. The method of claim 1, further comprising enabling a user to limit the change management information included in the change management report to change management information specific to software applications installed on a particular software platform.

11. The method of claim 10, wherein the user may limit the information included in the change management report from information collected from software applications installed on a plurality of software platforms.

12. A method for presenting an enterprise change and configuration management report comprises:
   identifying at least one first datasource that stores first change management information describing at least software changes and configurations other than version control information made to one or more first software applications installed on a first software platform from a first change and configuration management application operable to manage software changes and configurations, wherein the at least one first datasource comprises at least one database that operates on the first software platform;
   collecting the first change management information from the at least one first datasource;
   identifying at least one second datasource that stores second change management information describing software changes and configurations made to one or more second software applications installed on a second software platform from a second change and configuration management application operable to manage software changes and configurations, wherein the at least one second datasource operates on the second software platform, wherein the at least one second datasource comprises at least one VSAM file;
   collecting the second change management information from the at least one second datasource; and
   integrating, by a computer, the collected first change management information with the collected second change management information to provide a change management report that is accessible via a web browser.

13. A program storage device readable by a machine, tangibly embodying a program of instructions executable by the machine, the machine, when executing the program of instructions, operable to perform steps comprising:
   identifying at least one first datasource that stores first change management information describing software changes and configurations made to one or more first software applications installed on a first software platform from a first change and configuration management application operable to manage software changes and configurations, wherein the at least one first datasource comprises at least one database that operates on the first software platform;
   collecting the first change management information from the at least one first datasource;
   identifying at least one second datasource that stores second change management information describing software changes and configurations made to one or more second software applications installed on a second software platform from a second change and configuration management application operable to manage software changes and configurations, wherein the at least one second datasource operates on the second software platform, wherein the at least one second datasource comprises at least one VSAM file;
   collecting the second change management information from the at least one second datasource; and
   integrating the collected first change management information with the collected second change management information to provide a change management report that is accessible via a web browser.

14. A system for presenting an enterprise change and configuration management report comprises:
   a memory comprising program instructions;
   one or more processors coupled to the memory, the one or more processors, when executing the program instructions, operable to provide:
   an identifying device adapted to identify at least one first datasource that stores first change management information describing software changes and configurations made to one or more first software applications installed on a first software platform from a first change and configuration management application operable to manage software changes and configurations, wherein the at least one first datasource comprises at least one database that operates on the first software platform, wherein the identifying device is further adapted to identify at least one second datasource that stores second change management information describing software changes and configurations made to one or more second software applications installed on a second software platform from a second change and configuration management application operable to manage software changes and configurations, wherein the at least one second datasource operates on the second software platform, wherein the at least one second datasource comprises at least one VSAM file;

a collecting device adapted to collect the first change management information from the at least one first datasource identified by the identifying device, and further adapted to collect the second change management information from the at least one second datasource identified by the identifying device; and an integrating device adapted to integrate the collected first change management information with the collected second change management information into a change management report that is accessible via a web browser.

15. The system of claim 14, wherein:

the first software platform comprises a distributed platform and the second software platform comprises a mainframe platform.

16. The system of claim 15, wherein the first change and configuration management application and the one or more first applications are specific to the first software platform and the second change and configuration management application and the one or more second software applications are specific to the second software platform.

17. The system of claim 15, wherein the collecting device is adapted to:

collect the first change management information from the at least one first datasource using SQL queries; and collect the second change management information from the at least one second datasource using an API to download the second change management information from the at least one second datasource and write the second change management data to a file in CSV format.

18. The system of claim 17, further comprising a web-based user interface adapted to enable the user to generate the report using the web browser to access the at least one first datasource and the at least one second datasource.

19. The system of claim 14, wherein the integrating device further comprises:

an organizing device adapted to organize the collected first and second change management information into a report format; and a report generator adapted to generate the change management report in HTML format.

20. The system of claim 19, wherein the organizing device further comprises:

a selecting device adapted to enable a user to select one or more of the at least one first datasource or the at least one second datasource and to limit the contents of the report to data derived from the user-selected datasources.

21. The system of claim 19, wherein the organizing device further comprises:

a selecting device adapted to enable a user to select one or more software platforms and to limit the contents of the report to data derived from the user-selected software platforms.

* * * * *